US009933878B2

(12) United States Patent
Reilly

(10) Patent No.: US 9,933,878 B2
(45) Date of Patent: Apr. 3, 2018

(54) OPERATING A DEVICE HAVING A TOUCH-SCREEN DISPLAY

(71) Applicant: International Business Machines Corporation, Armonk, NY (US)

(72) Inventor: Tristram T. Reilly, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 13/936,503

(22) Filed: Jul. 8, 2013

(65) Prior Publication Data
US 2014/0028589 A1    Jan. 30, 2014

(30) Foreign Application Priority Data
Jul. 25, 2012 (GB) .................................. 1213224.7

(51) Int. Cl.
| | | |
|---|---|---|
| G06F 3/041 | (2006.01) | |
| G06F 21/84 | (2013.01) | |
| G06F 3/0488 | (2013.01) | |
| G06F 21/88 | (2013.01) | |

(52) U.S. Cl.
CPC .......... *G06F 3/0416* (2013.01); *G06F 3/0488* (2013.01); *G06F 3/04886* (2013.01); *G06F 21/84* (2013.01); *G06F 21/88* (2013.01); *G06F 2221/032* (2013.01); *G06F 2221/2133* (2013.01)

(58) Field of Classification Search
CPC ...................... G06F 2221/031; G06F 2221/032
USPC ........... 345/156–184; 713/189; 715/863–867
See application file for complete search history.

(56) References Cited

U.S. PATENT DOCUMENTS

| | | |
|---|---|---|
| 6,351,634 B1 | 2/2002 | Shin |
| 8,091,138 B2 | 1/2012 | Yellepeddy et al. |
| 2006/0026535 A1* | 2/2006 | Hotelling et al. ............ 715/863 |
| 2009/0006991 A1 | 1/2009 | Lindberg et al. |
| 2009/0264157 A1 | 10/2009 | Hsieh et al. |
| 2011/0074703 A1* | 3/2011 | Black ............................ 345/173 |
| 2011/0185186 A1 | 7/2011 | Adams et al. |
| 2011/0187497 A1 | 8/2011 | Chin |

(Continued)

FOREIGN PATENT DOCUMENTS

| | | |
|---|---|---|
| EP | 2306363 | 6/2011 |
| WO | 200045243 A1 | 8/2000 |

OTHER PUBLICATIONS ip.com, "Quick Security Lock for Touchscreen Device (gesture)," ip.com Journal, IP.com Prior Art Database; Disclosure No. IPCOM000203577D; Jan. 28, 2011; 1 page.

(Continued)

*Primary Examiner* — Carolyn R Edwards
(74) *Attorney, Agent, or Firm* — Cantor Colburn LLP; Nicholas Bowman

(57) ABSTRACT

Embodiments include methods, systems and computer program products for operating an electronic device having a touch screen display for displaying information. Embodiments include generating a designated location on the touch screen display for receiving a continuous touch contact. Based on detecting a continuous touch contact at the designated location, information is displayed on the touch screen. Based on detecting an absence of a continuous touch contact at the designated location on the touch screen display, the display of information is disabled.

17 Claims, 8 Drawing Sheets

(56) References Cited

U.S. PATENT DOCUMENTS

| | | | |
|---|---|---|---|
| 2011/0252243 A1 | 10/2011 | Brouwer et al. | |
| 2011/0283241 A1 | 11/2011 | Miller et al. | |
| 2012/0027265 A1* | 2/2012 | Black .................. | G06F 3/03545 |
| | | | 382/117 |
| 2012/0044164 A1* | 2/2012 | Kim et al. .................... | 345/173 |
| 2012/0071149 A1* | 3/2012 | Bandyopadhyay ... | G06F 1/1643 |
| | | | 455/418 |
| 2012/0127179 A1* | 5/2012 | Aspelin .................. | G06F 21/32 |
| | | | 345/441 |

OTHER PUBLICATIONS

Intellectual Property Office Search Report. Application No. GB1213224.7; dated Nov. 27, 2012; 4 pages.

\* cited by examiner

OPERATING A DEVICE HAVING A TOUCH-SCREEN DISPLAY

CROSS REFERENCE TO RELATED APPLICATION

This application claims priority to Great Britain Application Serial No. 1213224.7, filed Jul. 25, 2012, the contents of which is incorporated by reference herein in its entirety.

BACKGROUND

The present disclosure relates generally to the operation of an electronic device which has a touch screen display. More particularly, it relates to a method for the protection of sensitive information during the operation of such an electronic device.

In recent years there has been rapid growth in the use of portable wireless communication devices providing computing, telephone and Internet access functions. As the range of available functions has expanded, so has the range of uses to which these devices may be put. Many of these uses involve the transmission and storage of confidential information such as bank account transaction details and personal contact data such as address books. In general, these multifunctional devices often have a high monetary value and are also relatively small so as to be easily hand-held. There is therefore a substantial risk of these devices being stolen from a user, even while the devices are being used. The security of confidential information may be compromised as a result, particularly if it was being accessed at the time. Many modern mobile multifunctional devices are provided with a multipoint touch screen, also termed a multi-touch touch screen, for interfacing with the device.

BRIEF SUMMARY

Embodiments include methods, systems and computer program products for operating an electronic device having a touch screen display for displaying information. Embodiments include generating a designated location on the touch screen display for receiving a continuous touch contact. Based on detecting a continuous touch contact at the designated location, information is displayed on the touch screen. Based on detecting an absence of a continuous touch contact at the designated location on the touch screen display, the display of information is disabled.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1A:
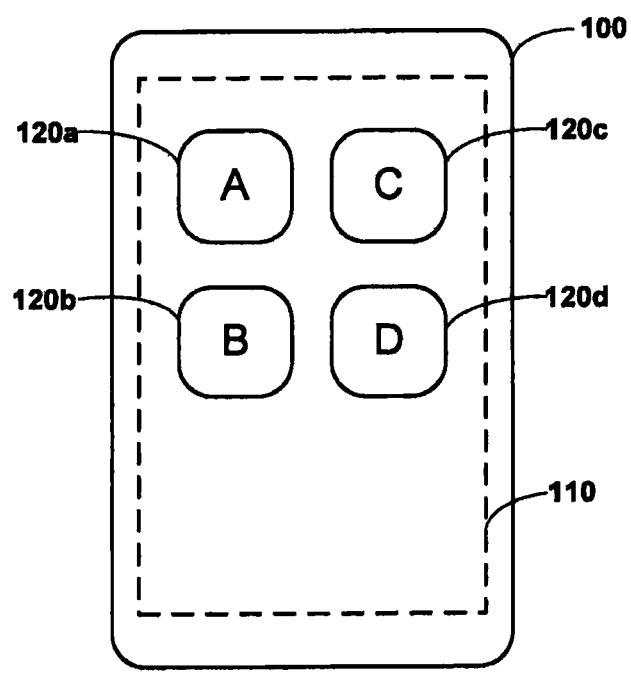
FIG. 1a is a plan view of an electronic device suitable for incorporating embodiments of the present disclosure.
Figure 1B:
FIG. 1b is an elevation view of an electronic device suitable for incorporating embodiments of the present disclosure.

FIGS. 1a and 1b illustrate, respectively, a plan view and an elevation view of an electronic device 100 suitable for incorporating an embodiment of the present disclosure. Electronic device 100 is suitably a multifunction device portable device, incorporating a range of functions. These functions may typically include communication functions, such as telephone and internet access functions, and personal organizer functions, such as diary and data storage functions. Examples of suitable portable electronic devices include multifunction mobile telephones and portable computers such as tablet computing devices having multi-touch touch screens, and the like. To allow convenient description, the figures illustrate a typical smartphone device but it will be apparent to a person skilled in the art that embodiments of the invention may be incorporated in other portable devices. Portable device 100 typically include a display screen, typically a liquid crystal display incorporating a touch screen 110 covering substantially the whole of the face of device 100. Another display type might be used such as a light-emitting diode (LED) display or a plasma display. In exemplary embodiments, the touch screen 110 is a multi-touch touch screen controlled by logic within device 100 capable of independently registering and tracking a plurality of simultaneous touch interactions.

Figure 2A:
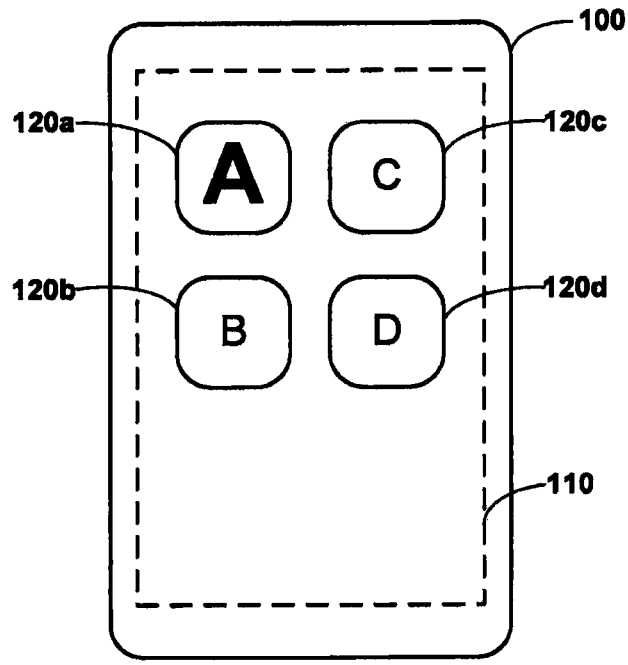
FIG. 2a illustrates an example user interface display on a device suitable for incorporating embodiments of the present disclosure.

FIG. 2a illustrates a mobile device suitable for incorporating an embodiment of the present disclosure including an example graphical user interface. Device 100 includes a touch screen display having a multi-touch touch screen display 110 displaying a graphical user interface comprising a plurality of selection options, for example icons 120a to 120d suitable for launching respectively applications A to D. According to the one embodiment, selection of, for example, a software application A by touching icon 120a, initiates the launch of an application A. In an example according to the one embodiment application A involves accessing sensitive information, for example information confidential to the user of device 100. In exemplary embodiments, setup options available to the user of device 100 allow the application A to be associated by the user with a security setting.

In other embodiments, the security settings may be enabled by default.

Figure 2B:
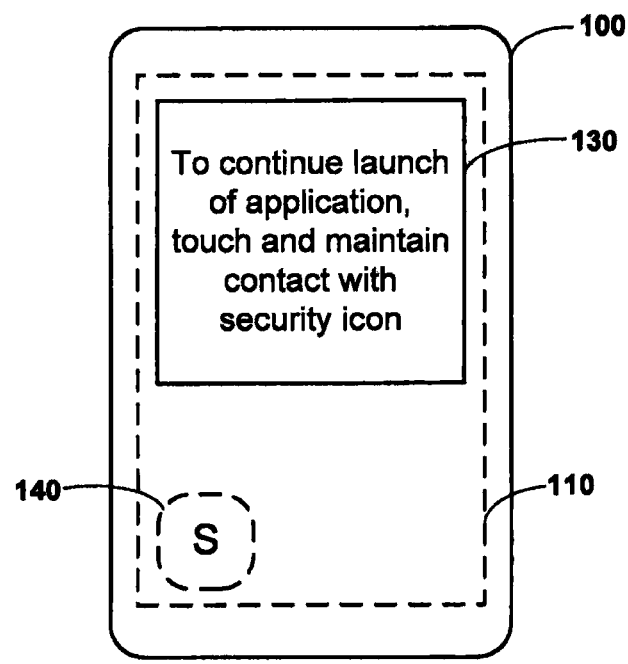
FIG. 2b illustrates an embodiment of the present disclosure showing an initial display requesting a user response.

After the security setting has been enabled, for example by the user, selection of application A by the user touching icon 120a causes loading of application A. Before the device allows access to the information in application A, an interaction with the user is initiated. In an embodiment, a message 130 is displayed as illustrated in FIG. 2b. Message 130 requests the user to touch and maintain contact with a particular designated location of touch screen display 110. In one embodiment, the designated location is selectable by the user during setup of application A. A person skilled in the art will understand that other possibilities exist, for example device 100 may specify a default location for the designated screen location. In one embodiment, as illustrated in FIG. 2b, the designated location is represented by screen area 140 labeled S. It will be apparent to one skilled in the art that designated screen area 140 may be indicated by an icon or similar on-screen indicator. In another embodiment, the designated screen area 140 may be an overlay, for example displayed over an icon, displayed on touch screen display 110. In another embodiment, designated screen area 140 may comprise a graphic or icon selected by the user. In yet another embodiment, the graphic or icon may be displayed in random locations on touch screen display 110. Alternatively, in another embodiment, screen area 140 may not be indicated visibly on touch screen display 110. In this alternative embodiment the designated screen area 140 is memorized by the user of device 100. It will be apparent that other ways of indicating designated screen area 140 are possible without departing from scope of the disclosure. In one embodiment, touch contact with touch screen display 110 at designated screen area 140 triggers the emitting of a touch event by the touch screen display 110 input/output controller in device 100. This touch event is communicated to the operating system of device 100. The touch event is detected by the operating system of device 100 and a notification, for example a message, passed to application A. Reception of notification of the touch event by application A allows the continuation of the launch of application A.

Figure 2C:
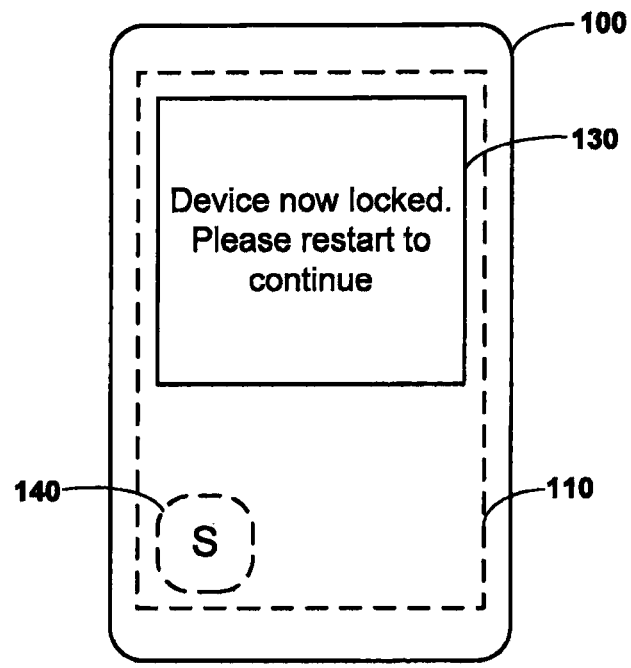
FIG. 2c illustrates an embodiment of the present disclosure showing an example display after an operation to lock the device.

In one embodiment, application A may now be interacted with, for example by a user of device 100 touching appropriate areas of touch screen 110 indicated on the graphical user interface. Interaction is only enabled so long as the user maintains contact with designated screen area 140. Interruption of contact, for example by lifting a digit touching designated screen area 140, is detected by touch screen display 110 input/output controller and a touch discontinuation event is emitted and communicated to by the operating system of device 100. A notification of touch discontinuation, for example a message, is passed to application A. Reception of the touch discontinuation notification by application A causes display of information by application A to be discontinued. In one embodiment, a further action by the user is now requested to re-enable access to information displayed by application A. In one embodiment, as illustrated in FIG. 2c, a further displayed message 130 informs the user that the application is now unavailable for viewing. In one embodiment, application A must be reinitiated. In another embodiment, as illustrated in FIG. 2c, the displayed message 130 informs the user that the device is now in a protected state. In yet another embodiment, the device is locked to the user and must be reinitiated by, for example, entry of a user password, or restarting of the device 100 by the user. In exemplary embodiments, the action of putting the device into a protected state includes encryption of data stored on the device. In this embodiment, a decryption key is required to reinitiate the device 100.

Figure 3:
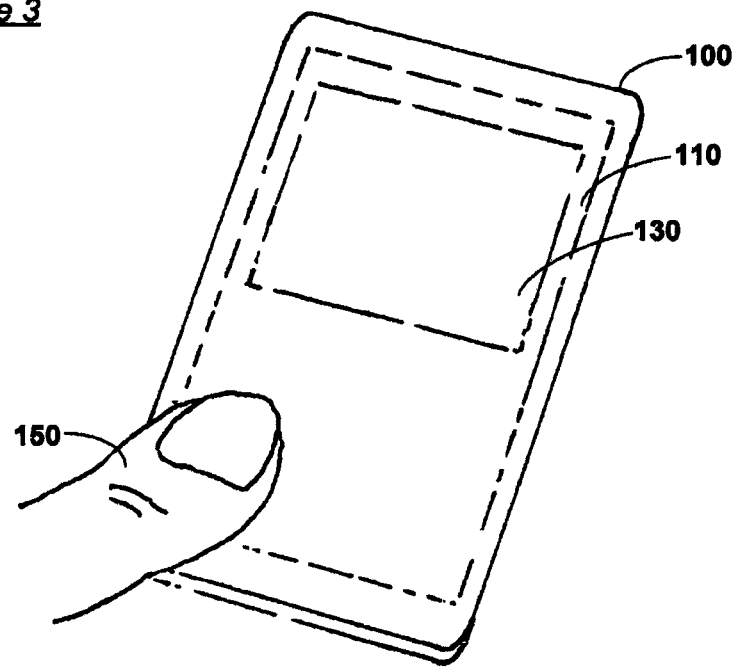
FIG. 3 illustrates a device incorporating a embodiment of the present disclosure during operation with a user contacting a designated location on the touch screen display of the device.

FIG. 3 illustrates a device 100 in use according to an embodiment. In exemplary embodiments, the user maintains touch contact by digit 150 with designated screen area 140 of touch screen display 110, as illustrated in FIG. 2c. Touch interaction by the user is enabled for interaction with, for example, application A. In one embodiment, illustrated in FIG. 3, a right-handed user maintains contact with designated screen area 140 by means of the left hand thumb. Touch interaction using the fingers of the right hand is possible over the remaining area of touch screen display 110. Conversely, a left-handed user might maintain contact with a designated screen area positioned towards the bottom right of the touch screen display 110 with the right-hand thumb.

It will be apparent to those skilled in the art that embodiments of the invention described above may function to protect access to a user's information such as confidential information. A thief snatching device 100 from its user during use will cause discontinuation of touch contact at screen area 140 by digit 150. Access to information displayed by application A will thereby be disabled, and information contained therein will be protected from access by the thief.

Figure 4:
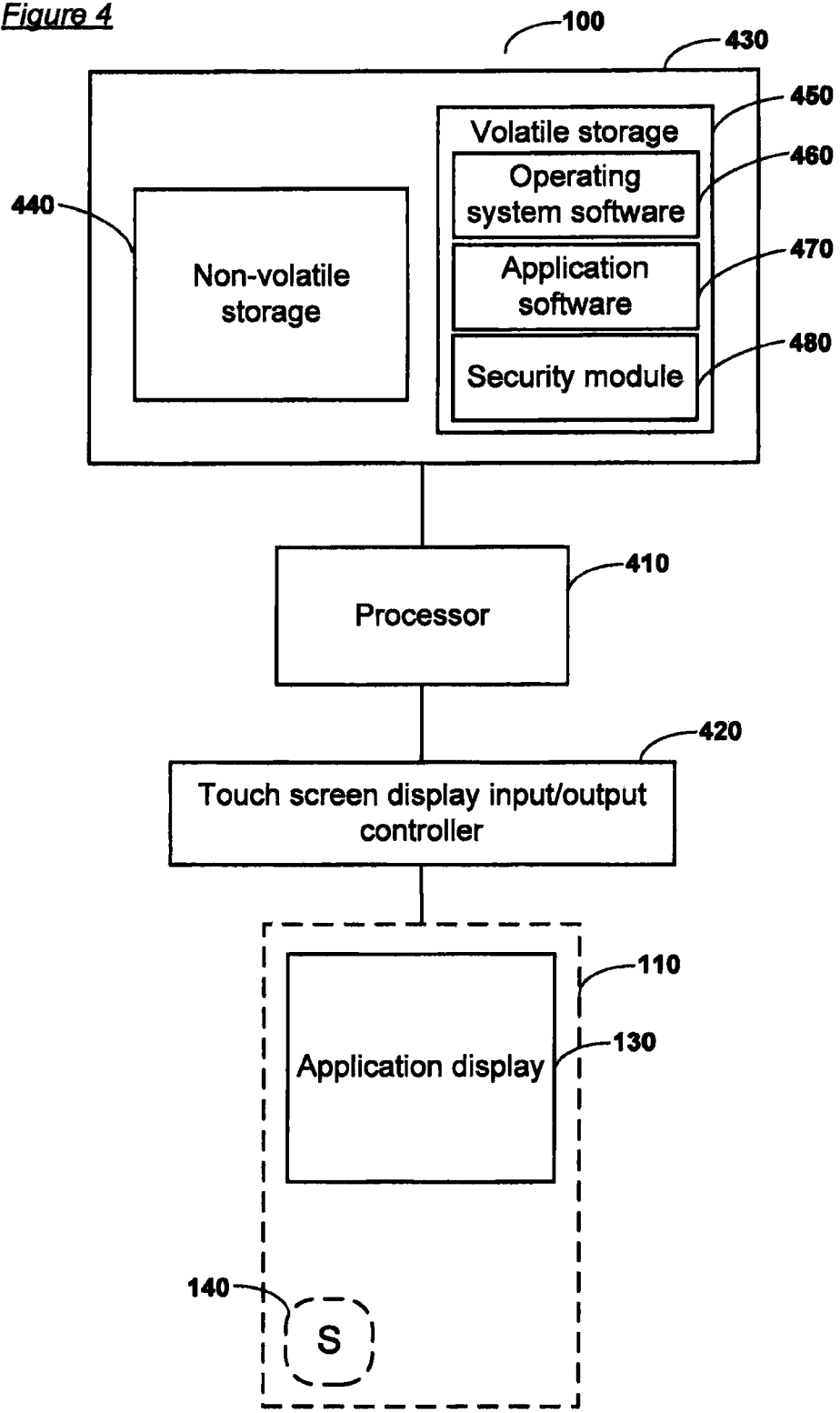
FIG. 4 illustrates a system diagram of a device incorporating a embodiment of the present disclosure.

FIG. 4 is a diagrammatic representation of component parts of a device according to an embodiment. In exemplary embodiments, device 100 includes a processor 410 that may be a processor optimized for use in a portable electronic device, for example having power consumption minimized as far as possible. In exemplary embodiments, the processor 410 is connected to touch screen display input/output controller 420 that communicates with touch screen 110. User inputs to application 130 and screen area 140, for example, by touch contacts with touch screen 110, are registered by touch screen display input/output controller 420 and communicated to processor 410. Information for display on touch screen 110 is received from processor 410 by touch screen display input/output controller 420 and rendered appropriately for display on touch screen 110. In exemplary embodiments, the processor 410 is also configured to access system memory 430, which may include non-volatile storage 440 containing for example operating system software, application software and user data. Non-volatile storage 440 may comprise solid-state storage, a magnetic disc drive, or other non-volatile storage means. System memory 430 may also include volatile memory 450. When device 100 is in operation, software is loaded from non-volatile storage 440 into volatile memory 450 by processor 410. For example, in one embodiment, device 100 operating system 460 and application software 470 are loaded into volatile storage. Data processing by processor 410 is controlled by operating system 460. Application software 470 is loaded from non-volatile storage 440 into volatile memory 450 as required, for example when an application icon is selected by a user on touch screen 110.

In one embodiment, application software 470 may include application A as previously described, selected by a user by touching icon 120a on the graphical user interface displayed on touch screen display 110. Information entered by a user by interaction with applications displayed on touch screen 110 may be saved in volatile memory 450 or stored in non-volatile storage 440. Data is moved by operating system 460 to touch screen display input/output controller 420 for display by touch screen 110, or to non-volatile storage 440 as required. Also illustrated in volatile storage is security module 480. In exemplary embodiments, the security module 480 includes the logic required to perform the steps of operation of the security setting. As such, security module 480 may be a software application loaded from non-volatile storage 440 into volatile storage 450 at startup of device 100.

Alternatively according to another embodiment, security module 480 may form part of operating system software 460. Alternatively, according to another embodiment, although illustrated as a software module, security module 480 may be embodied in hardware. In exemplary embodiments, such hardware may be an integral part of processor 410. Alternatively, according to another embodiment, security module 480 may be a separate hardware component, such as an application specific integrated circuit processor in device 100 dedicated to operating the security setting function. In another embodiment, security module 480 comprises an encryption function to encrypt user data on device 100 when the device.

Figure 5A:
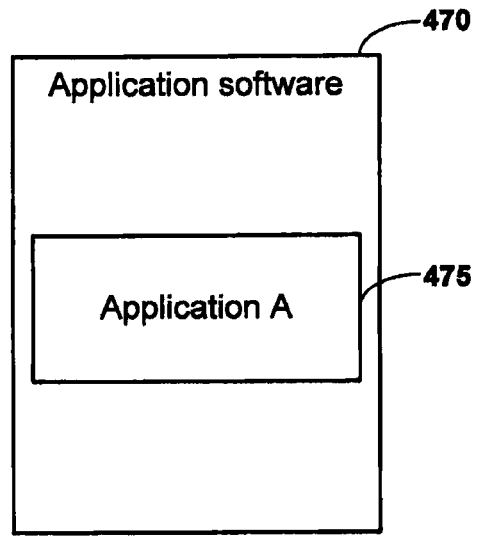
FIG. 5a illustrates application software of an embodiment of the present disclosure.
Figure 5B:
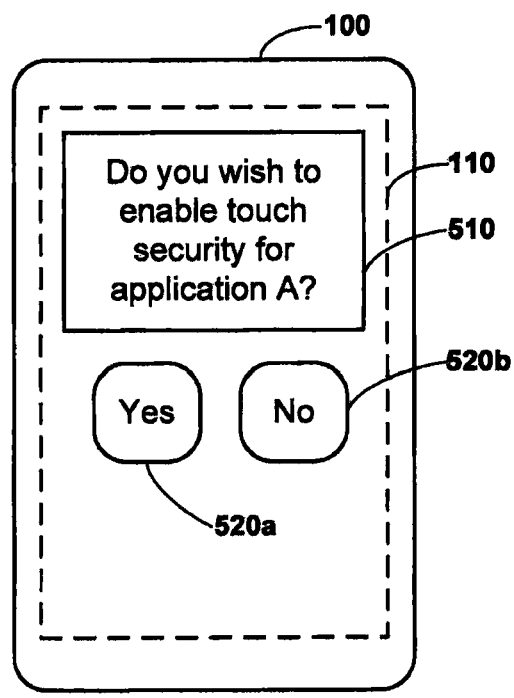
FIGS. 5b, 5c and 5d illustrate stages in the setup of an embodiment of the present disclosure.
Figure 5C:
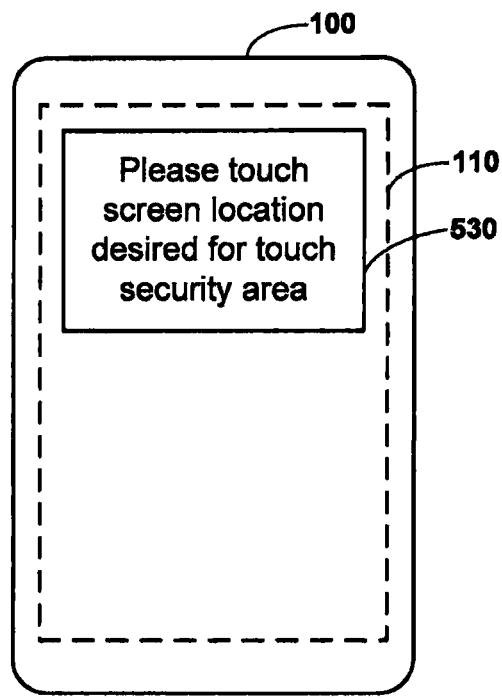
Figure 5D:
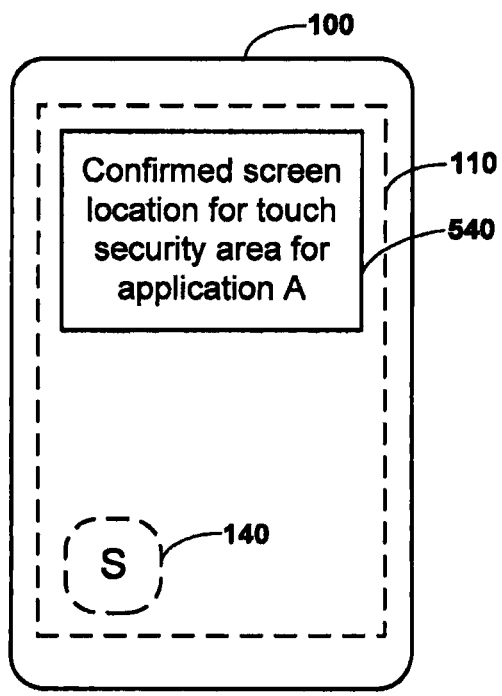

FIG. 5a illustrates application software 470 comprising application software 475 of application A. FIG. 5b illustrates a process for enabling the security setting according to an embodiment. It will be apparent to one skilled in the art that other mechanisms for setting up application software to enable the security setting may be employed without departing from the present invention. This setup process may be employed after application A is installed on device 100, for example when a user first selects application A after installation. The user selects application A, for example as described above with reference to FIG. 2a. In FIG. 5b a message 510 is displayed to the user on touch screen 110 asking if the user wishes to enable the security setting, for example with selectable yes and no options 520a and 520b displayed. If the yes option is selected, a further selection screen is presented as shown in FIG. 5c. In one embodiment a message 530 requests the user to select a screen location for the designated screen location 140 as described above with reference to FIG. 2b. The user touches touch screen 110 at the location desired for the designated screen touch security area 140 for application A. In an embodiment illustrated in FIG. 5d, a final message 540 is presented to the user indicating that the position of designated screen touch security area 140 for application A is as indicated on touch screen 110.

Figure 5E:
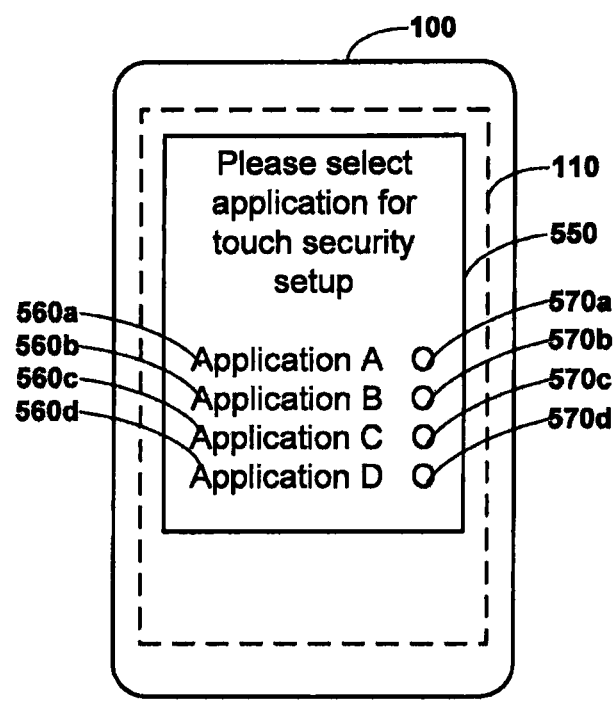
FIG. 5e illustrates setup in a further embodiment of the present disclosure.

It will be apparent to one skilled in the art that other setup mechanisms are possible without departing from the scope of the invention. In one embodiment, setup is carried out for device 100 and is applied to any application selected by a user as requiring the security setting. In this embodiment, the user may select from a menu list of installed applications as illustrated in FIG. 5e. A device setup menu 550 is presented to a user with a list of applications installed on device 100, for example applications A to D, 560a to 560d. In this embodiment, a user selects each application to which the security setting is to be applied. In FIG. 5e, the user selects the application or applications A to D by touching radio buttons 570a to 570d adjacent to each application in the list for enabling the security setting. In a further embodiment, applications installed on device 100 have the security setting selected by default. In this embodiment the user may deselect applications for which the security setting.

In another embodiment, the setup mechanism applies the security setting of the present invention to the complete device. In this embodiment, the user will enable the security setting of the present invention for the device 100 as a whole. The setup procedure may be similar to that employed in the previously described embodiments. Once set, the user will maintain touch contact with the designated screen area whenever the device 100 is in operation to enable interaction with the device. In another embodiment, the screen address of the designated screen area will be reserved by the device 100 operating software so that no other information, such as icons or text, is displayed at screen addresses covered by the designated screen area. In this embodiment, the user might, for example, scroll up, down or sideways in a multiple icon display, or a text display, and the icons or text would be adjusted to flow around rather than coinciding with any of the designated screen area.

In another embodiment, user interaction with device 100 is also possible using a keypad or keyboard attached to or linked to the device, or by using voice or gesture interaction with device 100.

Figure 6:
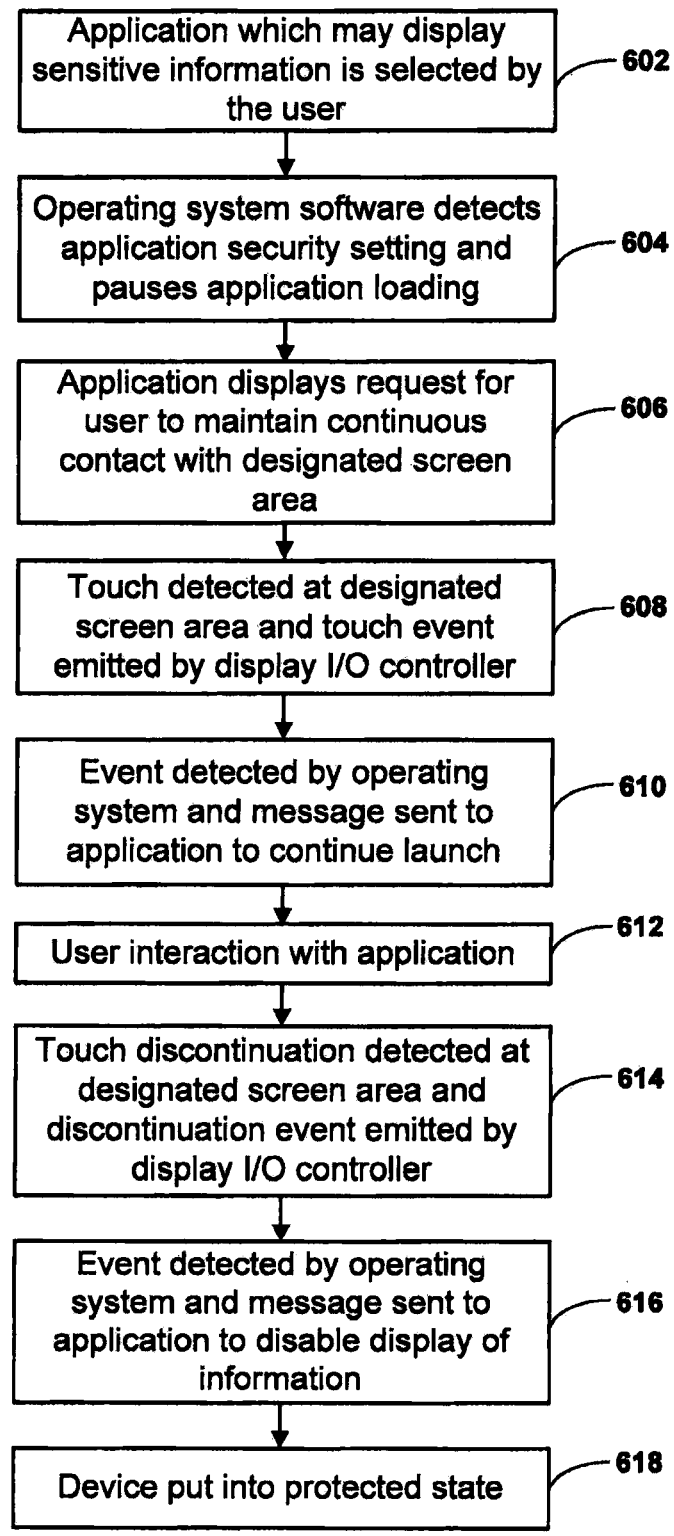
FIG. 6 is a flow diagram of the operation of an embodiment of the present invention.

FIG. 6 is a flow chart illustrating use of device according to an embodiment. At block 602, a user selects an icon displayed on the graphical user interface on touch screen 110. In an embodiment this is for example icon 120a shown in FIG. 1a which selects an application A comprising the security setting. At block 604 the security setting in application A software is detected by operating system software 460, for example using security module 480 which may form part of operating system software 460. This causes application A software to pause, for example by sending a pause message to application A software. At block 606, the pause state of application A software triggers display on touch screen 110 of a request for the user to maintain a continuous contact with a designated security area 140, also displayed on touch screen 110. The user touches touch screen 110 at designated security area 140, and maintains contact with for example a finger or thumb 150. At block 608 the touch is detected by touch screen display input/output controller 420. Touch screen display input/output controller 420 generates a touch event which is communicated to operating system software 460. At block 610, operating system software 460 detects the touch event. Operating system software 460 issues a notification, for example by sending a message to application A software, to continue loading and to allow interaction by the user with the graphical user interface displayed on touch screen 110, but only while continuous contact is detected.

At block 612 the user interacts with the user interface of application A displayed on the graphical user interface of touch screen 110. If the user ceases to maintain contact with designated screen area 140, for example by removal of digit 150, this contact discontinuation is detected by the display input/output controller 420. This causes display input/output controller 420 to emit a touch discontinuation event which is communicated to device operating system software 460 at block 614. At block 616 the event is detected by operating system software and a notification, for example a message, sent to application A to disable display of information. When application A completes this step, its displayed information is no longer visible to the user. Some form of re-initiation action by the user is now required, for example entry of a password or other validation information to restart application A. In optional block 618, operating system software 460 puts the device into a protected state, for example a locked state requiring entry of a device password or other validation information to continue use of the device. In one embodiment, putting the device into a protected state at block 618 comprises encrypting information stored in device 100, for example using an encryption application stored in device 100. Further access to stored information in this embodiment requires a decryption step including entry of a decryption key by a user or by an authorizing authority. In another embodiment, the decryption key is obtained from an authorizing authority by a legitimate user of device 100 after providing proof of credentials.

It will be apparent to those skilled in the art that the mechanism described may be implemented in any one of a number of ways. It may be implemented in addition to other security measures required for access to the device. For example, startup of device 100 may be protected by a password or similar security control. Similarly, launching of application A may be protected by a password or similar access control. It will further be apparent to those skilled in the art that the invention may be implemented in software logic, in hardware logic, or in a mixture of software and hardware logic.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for operating a handheld portable electronic device, the handheld portable electronic device comprising a touch screen display for displaying information, the method comprising:
receiving a request from a user to execute an application that provides access to a sensitive data;
designating a location on the touch screen display for receiving a continuous touch contact from the user;
displaying a message on the touch screen display instructing the user to place their finger at the location and to maintain the continuous touch contact;
based on detecting the continuous touch contact at the location, executing the application and displaying the sensitive data on the touch screen; and
based on detecting an absence of the continuous touch contact at the location on the touch screen display, disabling the display of the sensitive data, wherein disabling the display of the sensitive data places the device into a protected state, wherein the absence of the continuous touch contact is indicative that handheld portable electronic device has been removed from the users hand.

2. The method of claim 1, wherein the placing of the device into a protected state further comprises encrypting data contained in the device.

3. The method of claim 1, further comprising selecting by the user of the location on the touch screen as the designated location.

4. The method of claim 1, further comprising reserving a screen address associated with a designated screen location and communicating the address to operating system software of the device to prevent display of information other than that relating to the designated screen location at the screen address.

5. The method of claim 1, wherein the location is displayed as a blank portion of the touch screen display.

6. The method of claim 1, wherein the location is an overlay area over an icon displayed on the touch screen display and wherein the icon is displayed at a random location on the touch screen display.

7. The method of claim 1, wherein the location is indicated by a designated icon selected by the user.

8. A handheld portable electronic device having a touch screen display for displaying information and receiving touch input, the device comprising a processor configured to:
receive a request from a user to execute an application that provides access to a sensitive data;
designate a location on the touch screen display for receiving a continuous touch contact from the user;
display a message on the touch screen display instructing the user to place their finger at the location and to maintain the continuous touch contact;
based on detecting the continuous touch contact at the location, execute the application and display the sensitive data on the touch screen; and
based on detecting an absence of the continuous touch contact at the location on the touch screen display, disable the display of the sensitive data, wherein causing the display of information to be disabled further causes the device to be placed into a protected state, wherein the absence of the continuous touch contact is indicative that handheld portable electronic device has been removed from the users hand.

9. The handheld portable electronic device of claim 8, wherein the placing of the device into a protected state comprises an encryption component encrypting data contained in the device.

10. The handheld portable electronic device of claim 8, wherein the processor is further configured to reserve a screen address for preventing display of information other than that relating to the location at the screen address.

11. The handheld portable electronic device of claim 8, wherein the location is displayed as a blank portion of the touch screen display.

12. The handheld portable electronic device of claim 8, wherein the location is an overlay area over an icon displayed on the touch screen display and wherein the icon is displayed at a random location on the touch screen display.

13. The handheld portable electronic device of claim 8, wherein the location is indicated by a designated icon.

14. The handheld portable electronic device of claim 8, wherein the icon comprises a graphic selected by the user.

15. A computer program product for operating a handheld portable electronic device, the computer program product comprising:
a non-transitory computer readable storage medium having computer readable program code embodied therewith, the computer readable program code comprising:
computer readable program code configured for:
receiving a request from a user to execute an application that provides access to a sensitive data;
designating a location on a touch screen display for receiving a continuous touch contact from the user;
displaying a message on the touch screen display instructing the user to place their finger at the location and to maintain the continuous touch contact;
based on detecting the continuous touch contact at the location, executing the application and displaying the sensitive data on the touch screen; and
based on detecting an absence of the continuous touch contact at the location on the touch screen display, disabling the display of the sensitive data, wherein disabling the display of information places the device into a protected state, wherein the absence of the continuous touch contact is indicative that handheld portable electronic device has been removed from the users hand.

16. The computer program product of claim 15, wherein the placing of the device into a protected state further comprises encrypting data contained in the device.

17. The computer program product of claim 15, wherein the computer readable program code is further configured for selecting by a user of a location on the touch screen as the designated location.

* * * * *